Figure 4:
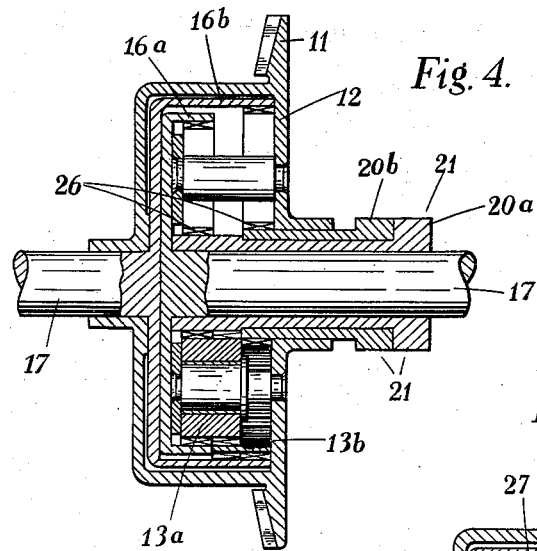

June 28, 1938.  R. J. IFIELD  2,121,915
DIFFERENTIAL OR BALANCE MECHANISM
Filed Feb. 15, 1937  3 Sheets-Sheet 1
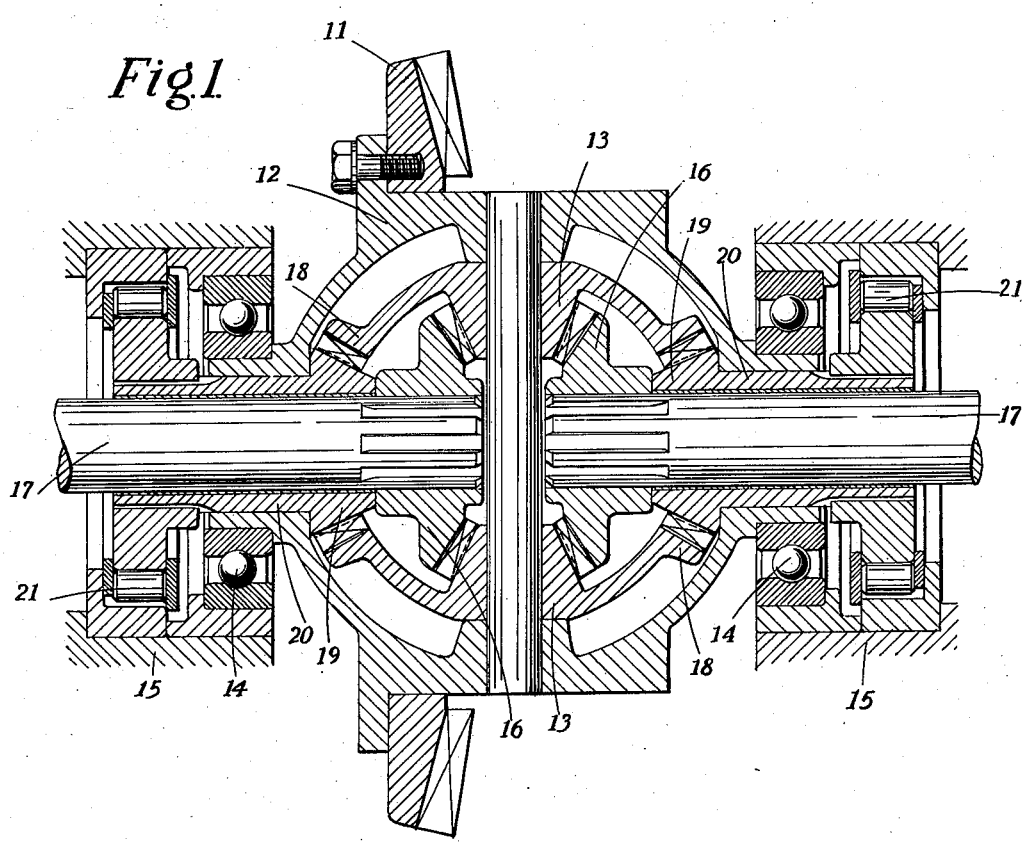
INVENTOR
Richard J. Ifield
BY
Mawhinney & Mawhinney
ATTORNEYS.

June 28, 1938.   R. J. IFIELD   2,121,915
DIFFERENTIAL OR BALANCE MECHANISM
Filed Feb. 15, 1937   3 Sheets-Sheet 2
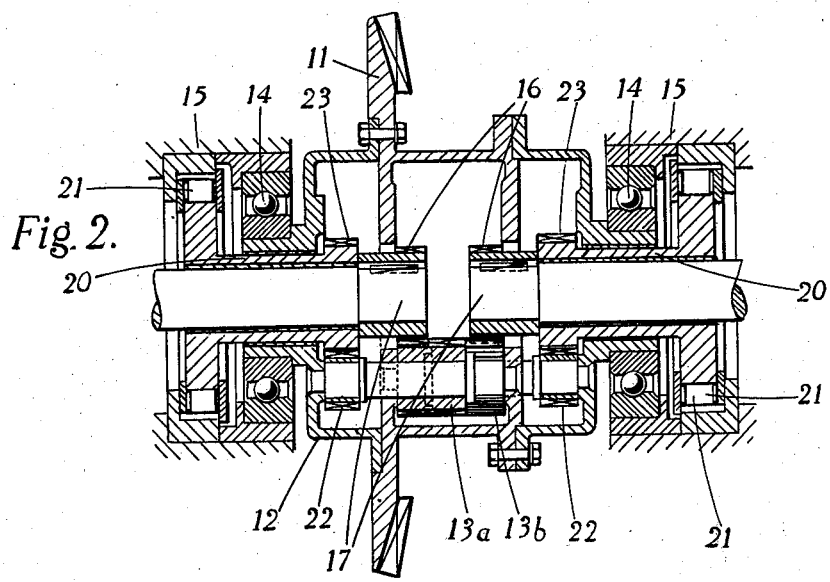
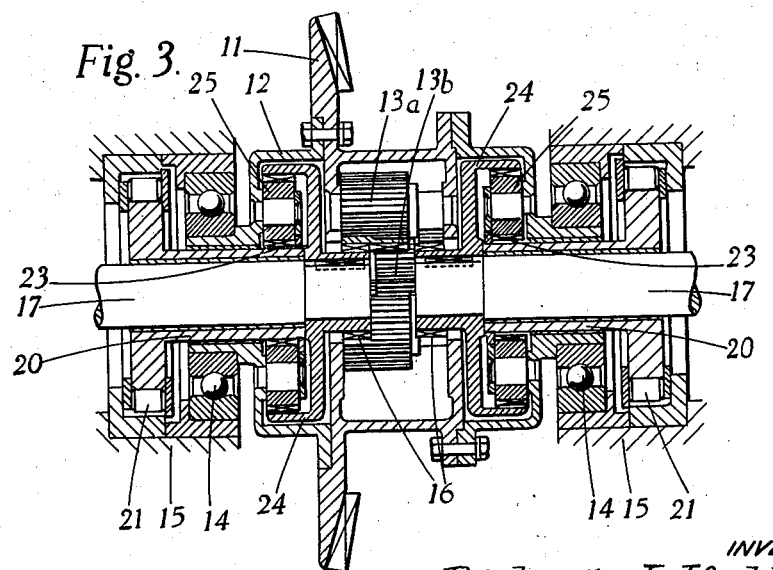
INVENTOR
Richard J. Ifield
BY
Mawhinney & Mawhinney
ATTORNEYS.

June 28, 1938. R. J. IFIELD 2,121,915
DIFFERENTIAL OR BALANCE MECHANISM
Filed Feb. 15, 1937 3 Sheets-Sheet 3

INVENTOR
Richard J. Ifield
BY
Mawhinney & Mawhinney
ATTORNEYS.

Patented June 28, 1938

2,121,915

UNITED STATES PATENT OFFICE 2,121,915

DIFFERENTIAL OR BALANCE MECHANISM

Richard Joseph Ifield, Coventry, England

Application February 15, 1937, Serial No. 125,902
In Great Britain February 14, 1936

5 Claims. (Cl. 74—315)

(Granted under the provisions of sec. 14, act of
March 2, 1927; 357 O. G. 5)

This invention relates to differential mechanism having one driving element and two coaxial driven elements—either or both of which may be an internally-toothed annulus or a sun gear, or one may be a planet-carrier—and particularly to a differential gear such as is used in the drive to the driven road wheels of motor-vehicles.

If one road wheel strikes a bump when the vehicle is being driven it is caused to spin under the driving torque whilst it is off the ground. This results in loss of tractive effort and in tire wear when the wheel again touches the ground. In a similar manner serious difficulties are sometimes encountered when one wheel slips on an icy surface or in boggy ground.

It is my main object to avoid these disadvantages.

According to the main feature of the invention, I provide means for positively preventing the driven coaxial gear wheels or other elements of a differential mechanism from being driven at such different speeds that the ratio of the greater to the less will exceed a predetermined value, dependent upon the maximum differential effect required, such means including an additional element for each coaxial driven element reversely geared thereto and associated with a one-way locking device. The one-way locking devices free-wheel to allow of the driven coaxial elements being driven at the same speed, but they can lock automatically when the coaxial elements are driven at different speeds to prevent the ratio of the greater speed to the less speed from exceeding the predetermined value.

In one arrangement according to the invention, the planet element of a differential gear (whether in the form of a bevel gear or of a pair of intermeshing pinions), in addition to driving driven coaxial gear wheels, drives through additional gearing on to sleeves connected with a stationary part through the said one-way locking devices. The arrangement is such that the ratio of the speeds of the faster-moving driven coaxial gear wheel to the slower-moving one will be as great as the maximum differential effect required in practice, but it should not, for preference, be materially greater. The maximum differential effect required in the case of a motor-vehicle is, of course, dependent upon the "turning circle" of the outer vehicle wheels, the track, and the wheel base. Thus, in the case of a motor-vehicle having a track of, say 4 feet and a rear wheel outer "turning circle" of, say, 30 feet, the "turning circle" for the inside rear wheel is 22 feet, giving a ratio of 30 to 22 or 1·154 to ·846 for one revolution of the driving element. The mechanism should be such that the ratio between the speeds of the faster-moving driven coaxial wheel to the slower-moving one will be nearly equal to but not less than this ratio.

In the accompanying diagrammatic drawings (in which like reference characters are used to denote similar parts as far as possible):—

Figure 1 is a sectional elevation of a common form of differential gearing adapted according to the invention, and Figures 2 to 6 are similar views, to smaller scales, showing other forms of differential gearing when adapted according to the invention. There are other suitable ways in which the gears may be arranged to achieve the effect of restriction by reversely gearing the reaction members to the coaxial driven gears as will be readily conceived.

In the construction of Figure 1, as applied to a differential gear, of a motor-vehicle, having a crown wheel 11 fast on a carrier 12 for a pair of planet elements 13, 13, the carrier being adapted in known manner to enclose the planet elements and being, for example, journalled in anti-friction bearings 14 in a stationary support 15, the planet elements are bevel pinions meshing with the driven elements 16, 16 in the form of sun gears fast on the driven half-axles 17, 17. The planet pinions are also formed with other coaxial gear teeth 18, 18 in mesh with bevel sun gears 19, 19 fast on sleeves 20, 20 which are freely mounted on the half-axles and connected to the stationary support through one-way locking devices 21, 21. Different kinds of one-way locking devices are well known in practice, though here they are shown in the form of roller-type free-wheels.

If the drive ratio of each planet pinion 13 to one of the driven elements 16 be, say, 1 to 2, and if the drive ratio of the additional gearing (18, 19) be, say, 2 to 1, then the maximum speed difference which can be obtained on the driven half-axles 17 will be in the ratio of 1¼ to ¾, i. e., 5 to 3 or 15 to 9. (This is a greater ratio, it should be observed, than is necessary in the case of a motor-vehicle having a 4-foot track and a 30-foot outer "turning circle".)

By varying the gear ratios aforesaid any desired maximum ratio between the speeds of the driven half-axles can be obtained, dependent upon the outer "turning circle" of the vehicle and the track thereof.

In the construction of Figure 2 the differential gearing is of the type where each planet element comprises a pair of similar pinions 13a, 13b mounted on parallel shafts and meshing with one another, each pinion meshing with only one of the driven coaxial wheels 16, 16. The pinions are fast, respectively, with gears 22, 22 driving on to sun gears 23, 23 fast on the sleeves 20, 20 above referred to—i. e., the sleeves which are freely journalled on the driven half-axles and connected to the stationary support 15 through the one-way locking devices 21, 21.

In either of the above forms of differential gearing, when a closer ratio is desired than can conveniently be directly obtained in the manner described, the additional gearing aforesaid may include a planetary or other form of gearing. Thus, as shown by Figure 3, the driven sun gears 16, 16 of a differential gear, in addition to being fast on the driven half-axles 17, are fast with internally-toothed annuli 24, 24 intermeshed with the sun gears 23, 23 fast on the sleeves 20, 20, by planet elements 25, 25 mounted on the planet-carrier 12 of the differential gear, no matter what form the planet elements of the latter take. The planetary gearings 23, 24, 25 (by which the driven sun gears 16 are connected to the one-way locking devices 21) are designed to give a ratio close to that which is theoretically desired.

In the differential gearing of Figure 4 the driven coaxial wheels 16a, 16b, fast on the half-axles 17, 17 are internally-toothed annuli, each planet element comprising a pair of planet pinions 13a, 13b as above described. (Although of different diameters, these have the same number of teeth.) The planet pinions are meshed, respectively, with sun gears 26, 26 fast on the sleeves 20a, 20b coacting at 21, 21 with the one-way locking devices (which are actually omitted in this figure). These locking devices may include a common outer member.

Figure 5:
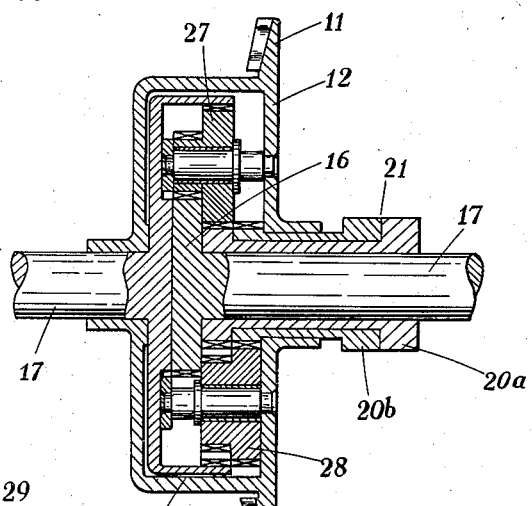

In the construction of Figure 5 the driven coaxial gears 16a, 16 are an internally-toothed annulus and a sun, respectively, intermeshed by a planet-element in the form of a compound pinion 27. The larger gear thereof drives the sleeves 20a and also meshes with the smaller gear of the compound planet 28 the larger gear whereof drives the sleeve 20b.

Figure 6:
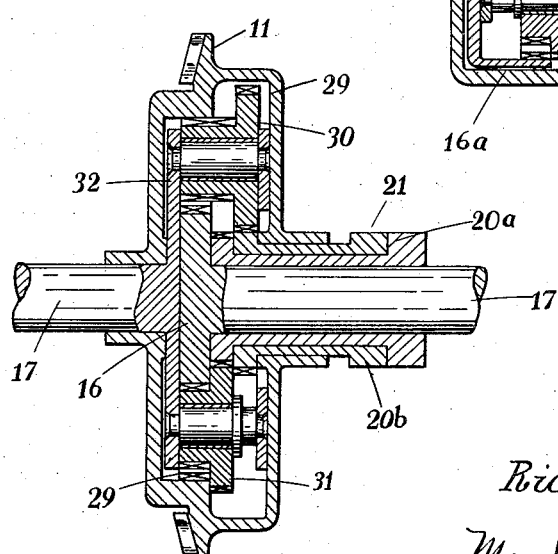

In the construction of Figure 6 the crown wheel 11 is fast with an internally-toothed annulus 29 driving on to the smaller gear of a compound planet 30. This smaller gear meshes with the larger gear of a compound planet 31. The larger gear of the planet 30 drives the sleeve 20b. The larger gear of the planet 31 drives the sleeve 20a, while the smaller drives the driven sun gear 16. The planet carrier 32 is in this case fast with one of the half-axles 17.

Such mechanism would not transmit a drive in the reverse direction, and when a reverse drive is necessary provision is made for releasing the one-way locking devices or for reversing them. Free-wheels and the like are well known in which this is possible. This modification of the one-way locking devices may be effected automatically if desired, either by a mechanical connection therewith to the gear change lever, or in other ways.

Thus, by means of the invention a differential gear can be constructed to provide whatever differential effect is required and substantially no greater differential effect, thus reducing the extent to which wheel spin can occur, and also to provide an automatic sprag effect by reason of the one-way locking devices.

When used for four, or more, wheel drives, the pairs of driving wheels may be differentially coupled and restricted by this means. For example, when turning a corner the sum of the front wheel speeds is greater than the sum of the rear wheel speeds, the difference being dependent on the wheel base of the vehicle. In this case there is need for only one restricting gear which may react through the one-way locking device on to a stationary part to prevent any excessive speed of the front wheels and lock to the power member to prevent the speed of the rear wheels from exceeding the front. It will no doubt be appreciated that, when braking, it is impossible for any wheel or wheels to become locked unless they all do.

What I claim as my invention and desire to secure by Letters Patent of the United States is:—

1. A differential gear including a driving element, two coaxial driven elements, two additional elements, one-way locking devices associated with said additional elements, said one-way locking devices being arranged adjacent one another, and means gearing said driven elements to said additional elements such that said driven elements are prevented from being driven at different speeds of which the ratio of the greater speed to the less speed exceeds a predetermined value dependent upon the maximum differential effect required, and said additional elements being in the form of sleeves coaxial with said coaxial driven elements, one of said sleeves being rotatively fitted upon the other.

2. A differential gear including a driving element, two coaxial driven gear wheels, a planet gear means carried by said driving element and intermeshing said driven gear wheels, one of said driven gear wheels being an internally-toothed annulus, two additional elements in the form of substantially concentric sleeves, and one-way locking devices associated with said additional elements and grouped beside one another, said planet gear means being meshed with said additional elements such that said driven gear wheels are prevented from being driven at different speeds of which the ratio of the greater speed to the less speed exceeds a predetermined value dependent upon the maximum differential effect required.

3. A differential gear including a driving element, two coaxial driven gear wheels, a planet gear means carried by said driving element and intermeshing said driven gear wheels, both of said driven gear wheels being internally-toothed annuli, two sleeves coaxial with said driven gear wheels, and one-way locking devices associated with said sleeves, said planet gear means being meshed with said sleeves such that said driven gear wheels are prevented from being driven at different speeds of which the ratio of the greater speed to the less speed exceeds a predetermined value dependent upon the maximum differential effect required.

4. A differential gear including a driving element, two coaxial driven gear wheels, a planet gear means carried by said driving element and intermeshing said driven gear wheels, said planet gear means comprising a pair of intermeshing compound pinions, two substantially concentric sleeves coaxial with said coaxial driven wheels, said sleeves formed with gear teeth in mesh, respectively, with said compound pinions, and one-way locking devices associated with said sleeves and grouped beside one another, the gearing being such that said driven gear wheels are prevented from being driven at different speeds of which the ratio of the greater speed to the less speed exceeds a predetermined value dependent upon the maximum differential effect required.

5. A differential gear including an internally-toothed driving annulus, two coaxial driven elements, a planet gear means intermeshing one of said driven elements and said driving annulus, the other of said driven elements carrying said planet gear means, said planet gear means comprising a pair of intermeshing compound pinions, and a pair of substantially concentric sleeve elements associated, respectively, with one-way locking devices, said sleeve elements meshing, respectively, with said compound pinions such that said driven elements are prevented from being driven at different speeds of which the ratio of the greater speed to the less speed exceeds a predetermined value.

RICHARD J. IFIELD.